July 24, 1928.  J. F. WHITE  1,678,174

THEFT PREVENTING DEVICE

Filed Jan. 22, 1925

Witness:
A. Burkhardt.

Inventor:
John F. White,

Patented July 24, 1928.

1,678,174

UNITED STATES PATENT OFFICE.

JOHN F. WHITE, OF CHICAGO, ILLINOIS, ASSIGNOR TO WHITE PRODUCTS COMPANY, OF CHICAGO, ILLINOIS, A CORPORATION OF ILLINOIS.

THEFT-PREVENTING DEVICE.

Application filed January 22, 1925. Serial No. 3,895.

This invention relates to securing devices for retaining closures, attachments, and the like against unauthorized operation or removal. It may be applied and utilized in a great variety of situations and particularly in instances wherein it may be desired to secure an object in a particular location or position.

The general object of the invention is the provision of apparatus of the sort described which is particularly adapted to prevent its disablement by attempts to force it, and which will also effectively resist attacks with formidable tools.

An important object of the invention is the provision of an apparatus of simple construction which is particularly qualified to retain its operativeness under exposure to weather.

Another object is the provision of a construction having the part adapted to the selected connection or mounting interchangeably assembled, so that a standard form of device may be adapted to a greater variety of applications simply by incorporation in it of the proper connecting element.

A further object is the provision of an apparatus which may be embodied in a form which is compact, of neat design and pleasing contour.

Other and further objects of the invention will be pointed out hereinafter, indicated in the appending claims, or obvious to one skilled in the art upon an understanding of the present disclosure.

For the purpose of this application I have elected to show and describe herein certain embodiments of the invention which are designed for particular applications or purposes. It is understood, however, that these are presented for the purpose of illustration only, and hence are not to be construed in any fashion such as to limit either the use or application of the invention or the nature or form of its embodiment, short of its true and most comprehensive scope as defined in the appended claims.

In the drawing forming a part of this specification,

Figure 1:
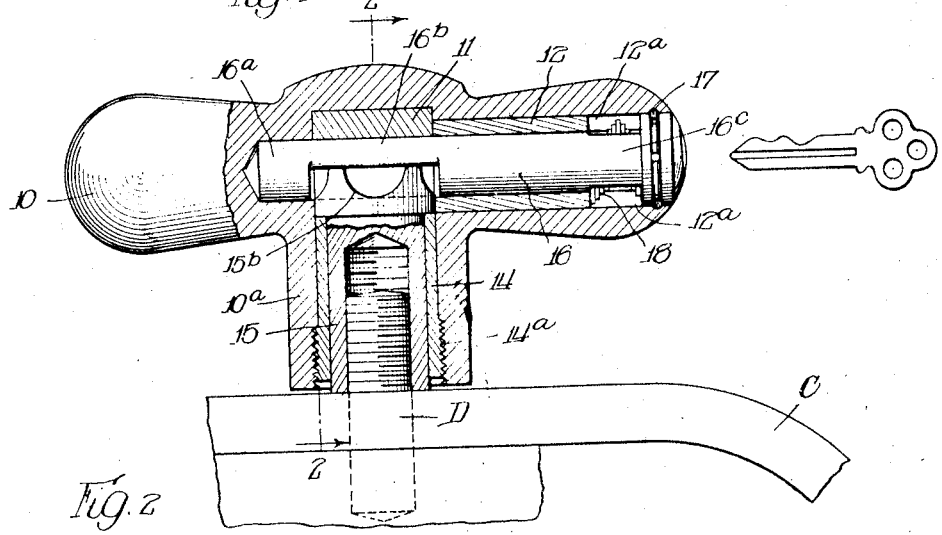
Fig. 1 is a part longitudinal sectional view of a securing device adapted for use in holding an object on mounting, such as for retaining a movable clamping member in place or holding an article on post or mounting.

As a means of convenient illustration of the use and certain advantages of the present invention, I will refer to a familiar application for the retaining of spare automobile tires or spare wheels on their racks or mountings. In many such racks the tire or the rim is retained by a clamping member which is drawn up by a nut or cap screw into engagement with the retained article, and the nut or cap screw ostensibly secured against removal by means of a padlock or similar expedient. In certain arrangements for retaining spare wheels, a post is provided on which the hub portion of the wheel fits and some sort of a securing device, usually in the form of a nut or cap, is screwed on to the post and locked thereto by a lock carried in the retaining member. The expedient of retaining articles in these familiar fashions offers little more than merely apparent security. Padlocks present many opportunities for successful attack and the rigid locking of a securing member to a mounting presents a situation in which the device is readily susceptible to disablement by efforts to detach it, which either shear off the securing lock bolt, or distort the parts to a degree rendering them inoperative. The present invention successfully avoids both of these contingencies by providing a completely housed and protected locking arrangement and preventing the application of effective force in such fashion as to deform or incapacitate the connections upon which the theft preventing effectiveness of the device depends.

The nature of the invention will be most quickly understood by immediate reference to the illustrative embodiments. In the embodiments illustrated in Figs. 1 and 2 of the drawing, the part designated by the reference character 10 is an operating member having a housing part $10^a$ from which operating handles extend laterally. The housing portion $10^a$ affords a cylindrical bore or chamber open at one end, while one of the handles has a longitudinal bore which intersects the bore of the housing. The operating member may be made of any suitable material of proper strength and susceptible of being worked readily and economically, such as brass. While such a material has important manufacturing advantages, it is not very resistant to attack by a tool such as a hack saw, which may be operated in such a fashion as not to attract attention. To qualify the device against such attacks, I provide in the upper portion of the housing a liner cap 11 which may be made of case hardened steel, and pressed into place, and line the bore of the handle with a case hardened steel tube 12, also pressed into place. The lower portion of the housing is similarly lined with a case hardened bushing 14 which is removably held in position by screw threads 14$^a$, so that the bushing may be screwed into and out of position by means of a spanner. In addition to affording protection, this bushing retains the operated member 15 in the housing. This is herein illustrated as tapped so as to seat upon a screw threaded post. It is rotatably retained within the bushing by means of an enlarged end part 15$^a$ which overlaps the inner end of the bushing and at its top contacts the lower surface of the cap member 11. The upper end of the operated member is grooved transversely so that the groove may align with the bore of the tube 12 and, for purposes of convenience, it may have a plurality of such transverse grooves as shown. Within the tube 12 and extending across the bore of the housing 10$^a$ is a rotatable bolt 16 which is held against withdrawal by means of a snap ring 17. Its inner end 16$^a$ has cylindrical bearing engagement on the operating member, but an intermediate portion is notched out for half its diameter across the bore of the housing, to form a locking key 16$^b$ adapted for engagement in the transverse groove 15$^b$ of the operated member, when the bolt 16 is turned to one position, or to lie in a complementary groove in the cap member 11 when the bolt 16 is rotated through an angular distance of 180°. The position of the bolt is controlled by a locking mechanism of the familiar cylinder and tumbler type, which is embodied in its outer end portion 16$^c$ so that the lock tumblers 18 may be projected by their springs into the grooves 12$^a$ which are milled in the end portion of the liner tube 12. It will be understood that the location of these grooves is such that the engagement of the lock tumblers therein secures the bolt 16 either in the position wherein the key 16$^b$ is seated in the groove 15$^b$ of the operated member as illustrated in Fig. 2, or in the opposite position illustrated in Fig. 1, wherein the key 16$^b$ is withheld from engagement with the operated member. The lock is operated in the customary fashion by the insertion of a plate key, which retracts the plungers 18 from the groove 12$^a$, so as to permit rotation of the bolt 16, the withdrawal of the key permitting the plungers to move out to their securing position under the influence of their springs.

Figure 2:
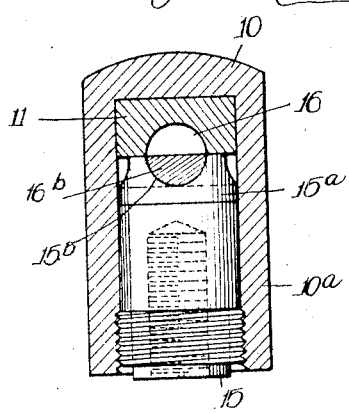
Fig. 2 is another sectional view of the same construction taken on substantially line 2—2 of Fig. 1.

Let it be assumed that as illustrated in Fig. 1 the portion C is a movable clamp which, when retained on a screw post D, will be effective to hold a tire or rim or other object in a desired location or position. The bolt 16 being in the position illustrated in Fig. 2, where the operated member 15 is held for rotation with the operating member 10, the device may be screwed on to the screw post D until the lower end of the operated member is bound firmly under stress against the clamp C, so that it cannot be backed off without the application of substantial effort. The bolt 16 then being rotated to the position illustrated in Fig. 1, the operated member will be completely freed from the control of the operating member, so that the latter will idle thereon and be entirely ineffective to transmit any pressure to the operated member effective to back it off. To insure the free idling of the operating member, it is desirable that the length of the operated member be such that its lower end projects slightly beyond the lower end of the housing 10$^a$ and the bushing 14. This freedom of the operating member prevents the application of pressures to it such as to deform it or its connection or injure or distort the locking members. It will be appreciated that by virtue of the very substantial contact there is afforded between the key 16$^b$ and the operated member 15 by their association in the manner shown, an extremely strong interlocking of the operating and operated members is secured which does not throw any stress upon the lock tumblers, and which makes possible the utilization of much force in binding the operated member in securing position.

Figure 3:
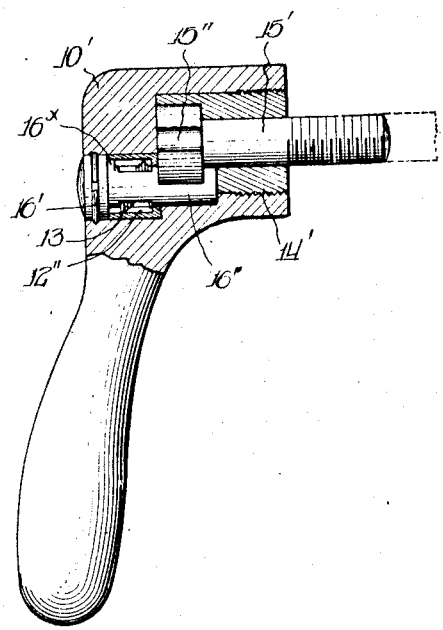
Fig. 3 is a part sectional view of another embodiment of the invention as it may be utilized to secure an article on mounting or to operate a latch or closure retaining means.
Figure 4:
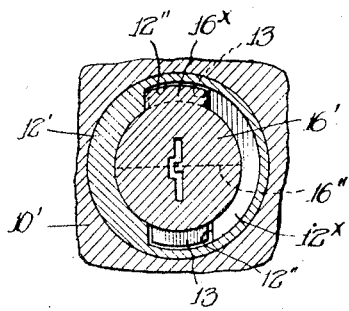
Fig. 4 is a part and elevation of such embodiment.

The embodiment illustrated in Figs. 3 and 4 may be employed in instances wherein it is not feasible to set the interlocking bolt in a laterally extending handle or extension. In this embodiment the operating member is designated 10' and the operated member 15'. The latter is rotatably secured in the housing portion of the former by means of the hardened bushing 14', as in the first form. In this embodiment the operated member 15' is illustrated as a screw which may be seated in a suitably tapped member constituting the mounting. The interlocking bolt 16' is mounted in a hardened tube 12' in the material of the operating member at the end of its housing in overlapping relationship with the head of the operated member, and it has a portion reduced to a semi-cylindrical form to provide the interlocking key 16″ which is adapted in one position of the bolt to engage in a seat 15″ in the operated member, and in its opposite position to clear the operated member. The position of the bolt 16′ is controlled by a tumbler lock cylinder, the tumblers of which are adapted to engage in slots 12″ provided in the fixed tube operating member, to hold the interlocking bolt in the selected position. When the interlocking key 16″ is engaged in the seat 15″, the operated member will be held for rotation with the operating member, and when the interlocking key is not so engaged, the operating member will idle on the operated member. The inner end of the interlocking bolt 16 is cylindrical to afford a supporting bearing at that end in either position of the bolt. Adjacent to its outer end the bolt is provided with a lug 16$^x$ which is adapted to travel in a groove 12$^x$ formed in the operating member 10′ around half the circumference of the bolt 16. This lug, as illustrated in Fig. 4 is adapted to come up against the end of the groove 12$^x$ when the lock tumblers are in alignment with the slots 12″. Thus the lug forms a positioning stop for the interlocking bolt. It has a further function, however, in that it supports any rotary pressures imparted to the interlocking bolt by the operated member incident to the seating of the device on its mounting, and prevents such pressures being imparted to the lock tumblers. Instead of being arranged for detachment from its mounting, the operated member may be formed without the screw threads and extended, as indicated in dotted lines, to form a permanent connection with a latch for securing a door or the like, the effectiveness or ineffectiveness of the operating member to operate the same being controlled by the position of the interlocking bolt 16.

In either of the embodiments illustrated, the device may be adapted to various sizes of mountings by virtue of the interchangeability of the operated member. It will be observed that when the device is attached to its mounting access to the operated member is precluded.

The invention possesses distinct advantage in its extreme simplicity and the strength afforded by construction of the interlocking parts of considerable size. All operating parts are closely housed so that access of foreign matter to the working parts is effectively prevented. A feature which is of great practical importance resides in the fact that it does not require any special fitting or adaptation of the mounting to which it may be applied.

I claim:

1. A theft preventing device comprising an operating member having a handle, an operated member rotatably housed in the operating member and arranged for connection to a support, an interlocking bolt completely housed in the operating member and having interlocking engagement with the operated member through the top portion thereof, and a lock housed in the operating member for holding the interlocking bolt selectively in and out of engagement with the operated member.

2. A theft preventing device comprising an operating member having a handle whereby it may be rotated, an operated member rotatably housed in the operating member and arranged for connection to a support, said operated member having a key seat extending across the face of the inner end thereof, an interlocking bolt rotatably housed in the operating member and having a key portion movable into and out of such seat, and lock mechanism housed in the operating member for holding said key selectively in and out of engagement with said seat.

3. A theft preventing device comprising an operating member having a handle, an operated member rotatably housed therein, a bushing removably mounted in the operating member and encompassing a portion of the operated member to retain it in the former, an interlocking bolt housed in the operating member at the inner end of the operated member, said bolt having a portion rotatable into and out of interlocking engagement with the operated member, and lock mechanism housed in the operating member for controlling position of the bolt.

4. A theft preventing device comprising an operating member having a handle, an operated member rotatably housed therein and having an enlarged end portion, an interlocking bolt rotatably housed in the operating member for engagement with said enlarged end portion and having bearing support on the operating member at opposite sides of said end portion, and locking mechanism housed by the operating member for securing the bolt selectively in and out of engagement with said end portion.

5. A theft preventing device comprising an operating member having a handle whereby it may be rotated, an operated member rotatably housed in the operating member, a bushing of highly resistant material encompassing the operated member to protect and retain it in the operating member, and interlocking mechanism protectively housed in the operating member for securing the operated member thereto for rotation.

6. A theft preventing device comprising a rotatable operating member, an operated member rotatably housed therein, an interlocking bolt housed in the operating member and extending across the inner end of the operated member, and key operated locking mechanism housed in the operating member for holding said bolt selectively in and out of interlocking engagement with the operated member.

7. A theft preventing device comprising a rotatable operating member, an operated member rotatably housed therein, an interlocking bolt housed in the operating member in overlapping relationship to the end of the operated member and adapted for interlocking engagement therewith, and key operated locking means housed in the operating member for holding said bolt out of interlocking engagement with the operated member.

8. A theft preventing device comprising a rotatable operating member, an operated member housed therein, a rotatable interlocking bolt housed in the operating member and having a lateral portion arranged for interlocking engagement across the inner end face of the operated member, and key operated locking means housed by the operating member for controlling rotation of said bolt.

9. A theft preventing device comprising an operating member, an operated member having an enlarged end portion positioned within said operating member, a sleeve secured in said operating member for retaining said operated member in place, the inner end face of said operated member being provided with a groove to receive a locking bolt, a locking bolt rotatably mounted in said operating member and locking means associated with said bolt for causing the engagement of said bolt in said groove.

10. A theft preventing device comprising an operating member, an operated member having an enlarged inner end portion housed within said operating member, said enlarged inner end portion being provided across the face thereof with a groove adapted to receive a locking bolt, a sleeve secured within said operating member for retaining said operated member in place, said operated member extending beyond the outer edge of said sleeve and said operating member, a locking bolt housed in said operating member, and locking means for causing the engagement of said bolt in the groove of said operated member.

11. A theft preventing device comprising an operating member, an operated member mounted in said operating member, the inner end face portion of said operated member being provided with a groove adapted to receive a locking bolt, a locking bolt positioned above the grooved end of said operated member and having a slot cut therein, said slot being so shaped as to permit relative rotation of the operated and operating members when said locking bolt is out of engagement with said groove, and locking means for rotating said bolt so as to engage in said groove and prohibit relative rotation of the operated and operating members.

In testimony whereof I have hereunto subscribed my name.

JOHN F. WHITE.